(12) United States Patent
Madan et al.

(10) Patent No.: US 7,062,482 B1
(45) Date of Patent: Jun. 13, 2006

(54) TECHNIQUES FOR PHONETIC SEARCHING

(75) Inventors: Umesh Madan, Bellevue, WA (US); Geary Eppley, Sammamish, WA (US)

(73) Assignee: Drugstore. com, Bellevue, WA (US)

( * ) Notice: Subject to any disclaimer, the term of this patent is extended or adjusted under 35 U.S.C. 154(b) by 351 days.

(21) Appl. No.: 09/965,541

(22) Filed: Sep. 26, 2001

Related U.S. Application Data

(60) Provisional application No. 60/271,068, filed on Feb. 22, 2001.

(51) Int. Cl.
G06F 17/30 (2006.01)
G06F 17/20 (2006.01)

(52) U.S. Cl. .................. 707/3; 707/2; 707/4; 704/8; 704/10

(58) Field of Classification Search ............... 707/1–5, 707/10, 100; 704/8, 200, 251, 277, 1, 4, 704/252, 10
See application file for complete search history.

(56) References Cited

U.S. PATENT DOCUMENTS

| | | | |
|---|---|---|---|
| 5,799,276 A * | 8/1998 | Komissarchik et al. ..... 704/251 |
| 6,408,270 B1 * | 6/2002 | Garber ........................ 704/251 |
| 2001/0029455 A1 * | 10/2001 | Chin et al. ................... 704/277 |
| 2002/0052870 A1 * | 5/2002 | Charlesworth et al. ........ 707/3 |

* cited by examiner

*Primary Examiner*—Alford W. Kindred
(74) *Attorney, Agent, or Firm*—Blakely, Sokoloff, Taylor & Zafman LLP

(57) ABSTRACT

In a network providing for electronic commerce, a computer system provides a user with access to a set of electronic commerce pages, category pages and databases for locating products electronically. To locate products electronically, the user performs a search using multiple words. The search terms in the search request are converted to canonical phonetic forms, and a phonetic keyword search based on the canonical phonetic forms is performed. The phonetic keyword search is then used to generate search results.

32 Claims, 4 Drawing Sheets

TECHNIQUES FOR PHONETIC SEARCHING

This U.S. patent application claims the benefit of U.S. Provisional Application No. 60/271,068, filed Feb. 22, 2001.

FIELD OF THE INVENTION

The invention relates to electronic information searching techniques. More particularly, the invention relates to a technique for providing improved search results for search requests related to electronically stored information.

BACKGROUND OF THE INVENTION

Huge quantities of information are available via the World Wide Web. For example, electronic commerce Web sites can offer for sale hundreds of products. Educational Web sites can offer access to the equivalent of thousands of printed volumes of information. To use these huge quantities of information, many Web sites provide search engines.

When accessing certain types of information, for example, pharmaceuticals on an electronic commerce Web site, the name or title of the specific information or product sought might be difficult to spell correctly. Misspelling of the name or title can result in poor search results. Returning to the pharmaceutical example, "acetaminophen" can be misspelled as "acitaminofen," or "aceitamenofen," or "ecytamenophin," or other misspellings can result.

To improve search results based on misspelled search requests, phonetic searching based on canonical representations of the search request has been used. The common phonetic algorithm is called Soundex, which assumes that all spelling confusion is caused by vowels. Accordingly, Soundex takes any given word and removes all vowels to produce a single canonical form. For example, the search engine would convert "Neutrogena" to "NTRGN," so that if a user typed "Neutrogina," the search engine searches the index for NTRGN and thus would find "Neutrogena."

Another phonetic algorithm is Metaphone, which improves on Soundex by taking into account the phonetic impact of combinations of letters when phoneticizing words. Like Soundex, Metaphone takes a given word and ignores vowels to produce a single canonical representation. However, before ignoring vowels, Metaphone extracts their phonetic meanings. Another feature of Metaphone is its treatment of related groups of letters known as diphthongs. Specifically, Metaphone generates a canonical spelling of a word by encoding any diphthongs, thereby replacing them with their phonetic representatives.

Though Metaphone improves on Soundex, Metaphone relies on there being a single canonical representation of a word. However, this works work well only for simple, well-known words with widely accepted pronunciations, where the user knows the pronunciation or is reasonably sure of the spelling. What is needed is an improved search engine for less familiar words, such as those used in the pharmaceutical industry.

SUMMARY OF THE INVENTION

A method of electronically searching for information is described. The method involves a user entering a search request. The search request is converted to multiple canonical phonetic forms of the search terms in the search request, and a phonetic keyword search is performed for each of the canonical phonetic forms. Finally, the search results are sent to the user, with the phonetic keyword search forming the basis, in part, for generating the results.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for phonetic searching of electronic documents are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides a method and apparatus for phonetic searching of electronic documents. Specifically, in a network providing for electronic commerce, a computer system provides a user with access to a set of electronic commerce pages, category pages and databases for locating products electronically. To locate products electronically, the user performs a search using multiple words. The search terms in the search request are converted to multiple canonical phonetic forms, and a phonetic keyword search based on the canonical phonetic forms is performed. The phonetic keyword search is then used to generate search results.

Figure 1:
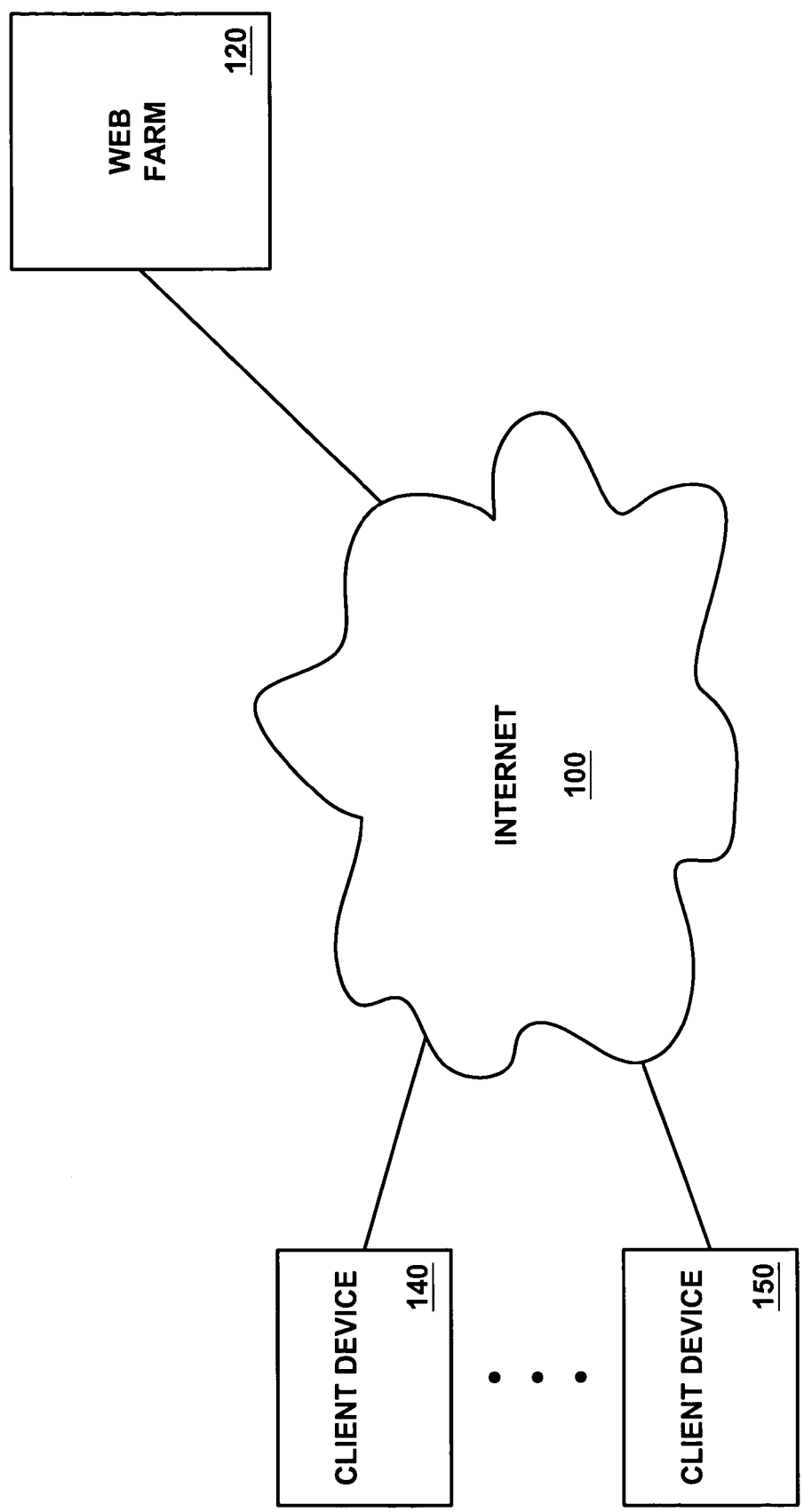
FIG. 1 is one embodiment of a network configuration for providing electronic commerce.

FIG. 1 is one embodiment of a network configuration for providing electronic commerce. Internet 100 provides a global interconnection of computing devices. The configuration of FIG. 1 illustrates the Internet as an interconnection medium between various parties; however, any network configuration (e.g., local area network, wide area network, metropolitan area network, Internet, intranet), whether wired or wireless, can be used. Also, any appropriate networking protocol can be used.

Client device 140 and client device 150 represent devices used to access networked resources for a user of the respective client devices. Any number of client devices can be coupled to Internet 100. In one embodiment, client devices 140 and 150 are computer systems; however, other devices can also be used. For example, client devices 140 and/or 150 can be "set-top boxes" or "Internet terminals" such as a WebTV™ terminal available from Sony Electronics, Inc. of Park Ridge, N.J., or a set-top box using a cable modem to access a network such as the Internet.

Alternatively, client devices 140 and/or 150 can be "dumb" terminals or thin client devices such as the Thin-STAR™ available from Network Computing Devices, Inc. of Mountain View, Calif. In another alternative embodiment, client devices 140 and/or 150 can be hand-held electronic devices, for example, personal digital assistants (PDAs), cellular telephones, pagers, or other electronic systems that provide network access.

Web farm 120 represents any configuration of servers that provide access to electronic resources such as, for example, Web pages and databases. In one embodiment, Web farm 120 includes multiple Hypertext Markup Language (HTML) servers that provide electronic commerce Web pages to client devices 140 and/or 150. Any configuration that provides access to electronic resources using any appropriate protocol can be used.

Figure 2:
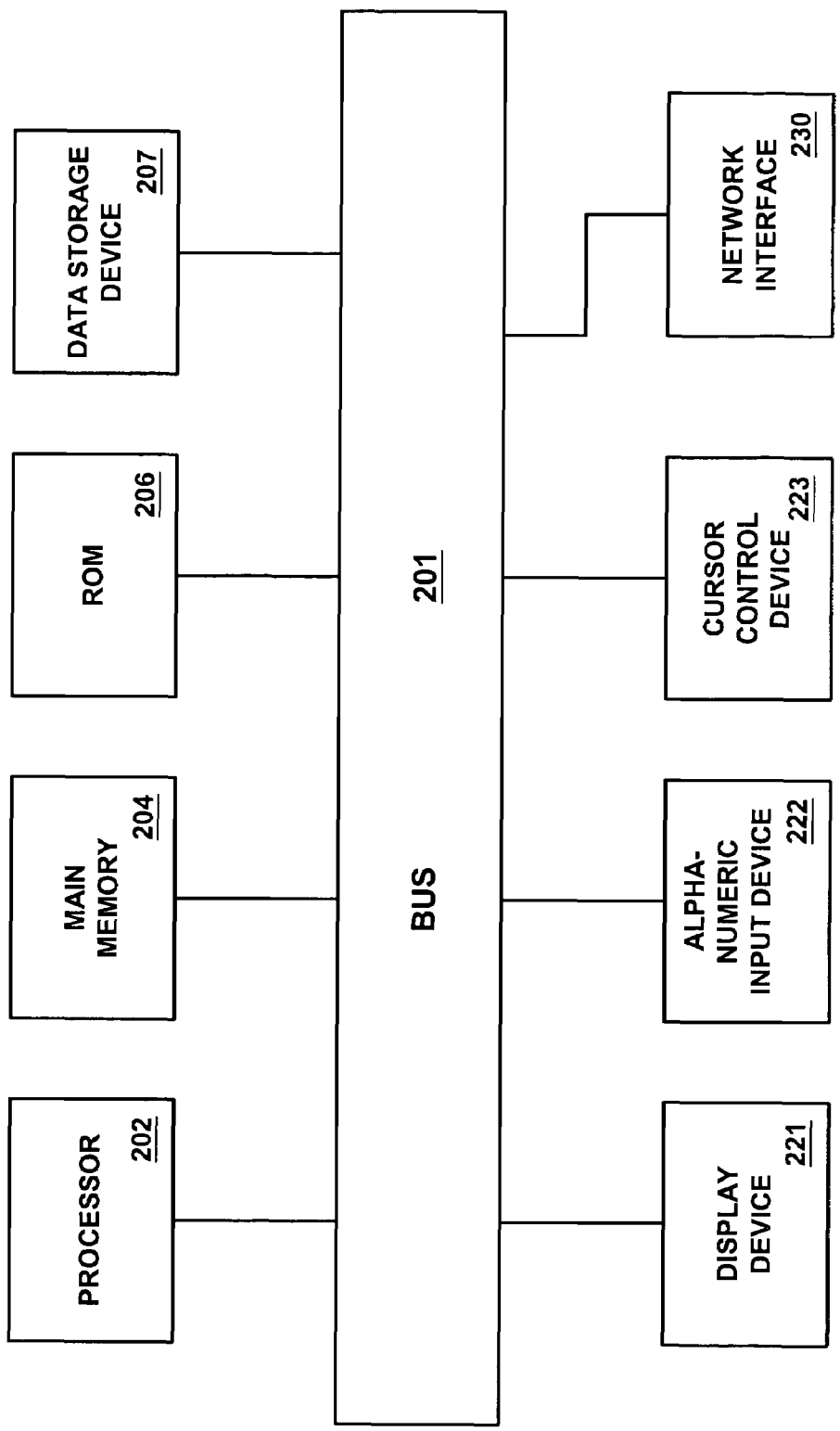
FIG. 2 is one embodiment of a computer system suitable for use with electronic commerce.

FIG. 2 is one embodiment of a computer system suitable for use with the invention. The computer system illustrated in FIG. 2 is intended to represent a range of electronic systems, for example, computer systems. Alternative electronic systems can include more, fewer and/or different components.

Computer system 200 includes bus 201 or other communication device to communicate information, and processor 202 coupled to bus 201 to process information. While computer system 200 is illustrated with a single processor, computer system 200 can include multiple processors and/or co-processors. Computer system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Computer system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to computer system 200.

Computer system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221.

Network interface 230 provides an interface between computer system 200 and an external network (not shown in FIG. 2). Network interface 230 can be, for example, a network interface card (NIC) or any other type of network interface capable of providing network access to computer system 200.

Instructions are provided to main memory 204 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to provide on-line prescription ordering.

Figure 3:
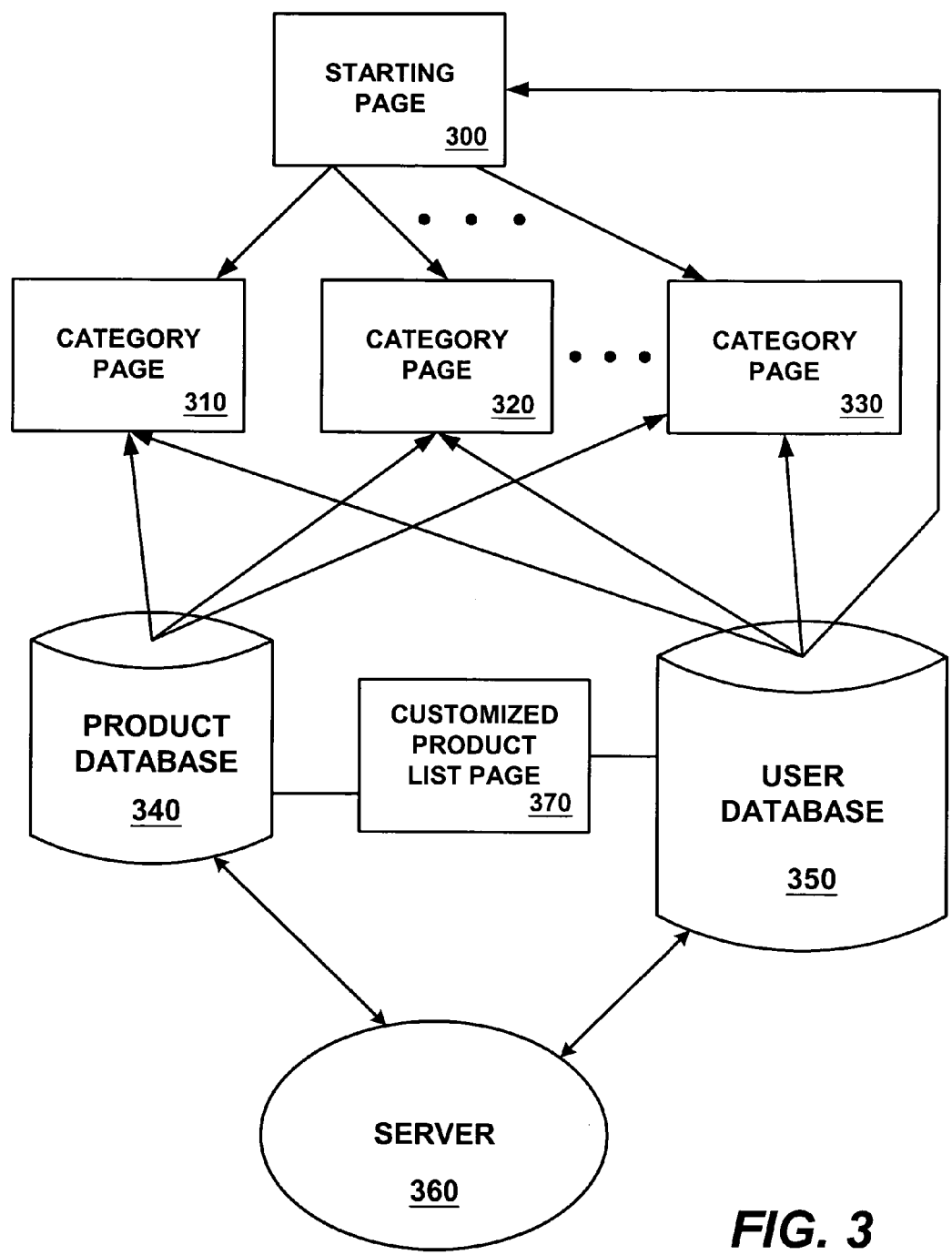
FIG. 3 illustrates one embodiment of a configuration for providing a set of World Wide Web electronic commerce pages.

FIG. 3 illustrates one embodiment of a configuration for providing a set of World Wide Web electronic commerce pages. Starting page 300 provides a starting page for users of an electronic commerce site. Starting page 300 can be different for different users, to provide a more customized experience for the user, or starting page 300 can be the same for all users. In one embodiment, starting page 300 is a Hypertext Markup Language (HTML) document; however, any appropriate programming language can be used.

Starting page 300 can receive user information from user database 350. In one embodiment, user database 350 stores information (e.g., name, address, preference information, previous order information) related to users of the electronic commerce site. User information can be retrieved from user database 350 based on, for example, using a "cookie" stored on the user's computer system to identify which user to retrieve information for, or alternatively, based on a login procedure.

In general, a cookie is information that a Web server stores on a client device to provide information to the server at a later time. A cookie can, for example, provide identification information, preferences, or similar information to the server when the client device subsequently contacts the server. The cookie can be used to identify a user and the corresponding information can be retrieved from user database 350 and used without requiring the user to enter information that had previously been provided.

From starting page 300, a user can navigate to one of several category pages (e.g., 310, 320, 330). In one embodiment, the category pages provide information (e.g., photographs, prices, manufacturer) related to various products offered for sale through the electronic commerce site. In one embodiment, product information is provided in response to user requests by product database 340, which can be implemented in any manner known in the art. Also, although not shown in FIG. 3, product database 340 can also provide information to starting page 300.

Category pages are not required; however, some organization of information that a user can navigate may provide a better experience for the user. Starting page 300 can also provide links to multiple related Web pages, rather than categories. For example, starting page 300 can operate as an electronic commerce "mall" and provide links to more specific electronic commerce sites (e.g., clothing, jewelry, electronics).

In one embodiment, customized product list page 370 is compiled from product database 340 and user database 350 for each user that accesses starting page 300. Customized product list page 370 includes information related to previous purchases. For example, customized product list page 370 can list all products previously purchased by a particular user, either in a categorized (e.g., by product category, by date, by price) format or an uncategorized format. Customized product list page 370 can also include additional information such as, for example, products the user intends to purchase in the future, or products that the user wishes to research. A customized product listing can also be provided to the user in a different format, for example, the listing can be in the form of a menu or any other format.

Server 360 operates in conjunction with product database 340 and user database 350 to provide starting page 300 and multiple category pages with product information and user information as described above.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

Figure 4:
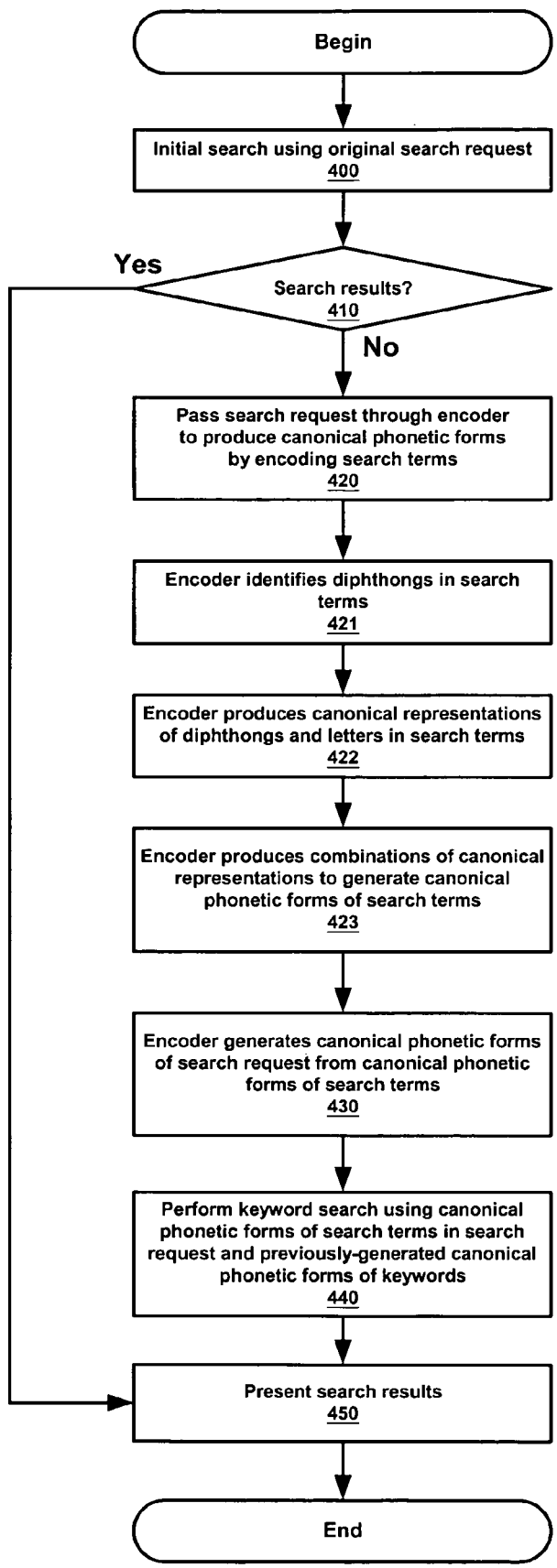
FIG. 4 is an overview flowchart for providing search results using multiple canonical forms of the words in a search request.

FIG. 4 is an overview flowchart for providing search results using multiple canonical phonetic forms of the search terms in a user's search request.

At 400, an initial search is attempted based on the words in the user's initial search request. This initial search can be performed in any manner known in the art. At 410, a determination is made based on whether the initial search request is successful. If the initial search request produces search results, the search results are presented at 450, for example, by displaying the search results to the user. If the initial search request fails to produce search results, the search request is passed through an encoder at 420 to produce multiple canonical phonetic forms of each "search term" in the search request. In one embodiment, if a user performs a basic Boolean search by entering a search request for words separated by a logical AND operator or a logical OR operator, for example, the words in the search request other than the logical operators constitute search terms. If there are multiple search terms in the search request, multiple canonical phonetic forms are generated for each search term in the search request. It is also possible for the encoder to determine that there is only a single canonical phonetic form of a search term in the search request.

Encoding begins at 421 with identification of any diphthongs contained in each search term in the search request. In one embodiment, for each search term, the encoder analyzes each letter in combination with the letters preceding and following the subject letter, and identifies any diphthongs. For each diphthong, a collection of possible replacements, or "canonical representations," is generated at 422 based on the pronunciation of the diphthong, as the encoder generates spellings of the possible pronunciations of the diphthongs identified. Similarly, if a letter standing alone has multiple pronunciations, canonical representations of the letter are generated. Finally, at 423 combinations of the canonical representations of the diphthongs and canonical representations of the letters are produced to generate one or more canonical phonetic forms of each search term in the search request.

For example, the search request "A AND B" contains two search terms "A" and "B," and generates the combinations (A1, A2, A3) and (B1, B2, B3). A1, A2, A3 and B1, B2, B3 are canonical phonetic forms of the search terms A and B, respectively, each consisting of different combinations of the canonical representations of the diphthongs and letters in A and B, respectively, thus representing possible spellings of the pronunciations of A and B, respectively. In one embodiment, each vowel in a search term is analyzed in combination with the letters before and after the vowel to determine pronunciations that are spelled in order to generate canonical representations of diphthongs and letters in the search term. However, the canonical representations themselves do not contain any vowels. In one embodiment, any character in a search term that is not a letter is ignored, as is the second instance of a letter that appears back-to-back in a search term.

In one embodiment, canonical phonetic forms are limited in length to a maximum of six characters. However, any length of canonical phonetic forms can be used in association with the search technique described herein. In one embodiment, "stemming" is provided for the canonical phonetic forms of the search request. A search that includes stemming allows longer words to be considered matches. For example, typing the word "pain" should return all matches for words that begin with "pain," including "painful" and "painless." Similarly, the canonical phonetic forms (A1, A2, A3) generated from the search term A would return matches for words such as "A1-ful," "A2-ing," and "A3-less."

At 430, a canonical phonetic form of the search request is generated from the canonical phonetic forms of the search terms. In one embodiment, the canonical phonetic form of the search request is generated using an "AND" connector to join sets of canonical phonetic forms of the search terms. Thus, the original search request containing the search terms A and B, along with the canonical phonetic forms of A and B, result in the canonical phonetic form ((A1, A2, A3) AND (B1, B2, B3)) for the search request. If the search request contains only one search term, the set of canonical phonetic forms of the search term is the canonical phonetic form of the search request.

In one embodiment, "keywords" in the area in which the user is searching, each of which could be a word for which the user is searching, are passed through an encoder as described above to generate canonical phonetic forms of the keywords. In one embodiment, the canonical phonetic forms of the keywords are pre-generated (i.e., generated prior to the user performing a search), stored and periodically updated. For example, for a search in the pharmaceutical industry, brand and drug names would be keywords passed through the encoder to pre-generate their canonical phonetic forms, in the same manner as described above for the search terms A and B.

At 440, a phonetic keyword search is performed using the canonical phonetic form of the search request and the canonical phonetic forms of the keywords. Canonical phonetic forms of search terms in the search request and canonical phonetic forms of the keywords are compared to determine any matches and provide search results for the user's search request. In one embodiment, the phonetic keyword search is an AND search, which can be performed in any manner known in the art. For example, Index Server available from Microsoft Corporation of Redmond, Wash. can be used as a search engine. Other search engines or other search techniques can also be used. The phonetic keyword search result provides a set of all possible matches for the search terms from which the encoder generated the canonical phonetic form of the search request. Finally, at 450 the search results are presented, for example, by being displayed to the user.

Thus, phonetic searching is reduced to a specialized type of keyword matching using canonical phonetic forms to perform the search. Consequently, taking "stemming" into account, a phonetic keyword search using the canonical phonetic form ((A1, A2, A3) AND (B1, B2, B3)) generated for the search request containing the search terms A and B is conducted using the pre-generated canonical phonetic forms of keywords. For a search in the pharmaceutical industry, for example, using canonical phonetic forms of brand and drug names as keywords, the phonetic keyword search for ((A1, A2, A3) AND (B1, B2, B3)) would generate as search results any brand or drug name that: (1) contained two words, where (2) one word has a possible pronunciation A1, A2 or A3, or a pronunciation whose beginning sounds are one of A1, A2 or A3; and where (3) the other word has a possible pronunciation B1, B2 or B3, or a pronunciation whose beginning sounds are one of B1, B2 or B3.

Generating multiple canonical phonetic forms of the search terms in a search request, and of keywords that potentially match the search terms in the search request, increases the likelihood of finding a word that has an unfamiliar spelling. A user is likely to spell an unfamiliar word based on the way the user pronounces the word. Because different users are likely to pronounce the same word differently, they are also likely to spell it differently in their search requests, meaning there could be more than one way to spell the word incorrectly. Thus, if there is only a single canonical phonetic form of the word, many users will not be able to find the word. However, generating multiple canonical phonetic forms of the word, and of potential word matches, by analyzing each letter in the word in connection with surrounding letters increases both the number of canonical phonetic forms of the word for which to search, and the number of canonical phonetic forms of words that can match the word for which a user is searching. This increases the user's chances of finding the word, without the user having to use an accurate spelling of the word to generate an effective search result.

FIG. 4 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method comprising:
   receiving a search request at a server from a client over a network, the search request including one or more search terms;
   for each search term in the search request, the server identifying all diphthongs within each search term;
   the server determining one or more canonical representations for each diphthong based on pronunciation of each diphthong, the one or more canonical representations being in text formats;
   the server generating one or more canonical phonetic forms for each search term based on possible spellings of the one or more canonical representations of each diphthong, including
      determining whether any canonical representations exist for one or more letters of each search term, and including in the one or more canonical phonetic forms of any canonical representations exist for one or more letters of each search term;
   the server performing a phonetic keyword search in a database coupled to the server for each canonical phonetic form of the search term, wherein the canonical phonetic search is performed based on the canonical phonetic forms generated from the canonical representation of both letters and diphthongs of the search request; and
   the server generating an indication of search results based, on the phonetic keyword search.

2. The method of claim 1, further comprising performing an initial search in the database based on each search term of the search request, wherein identifying all diphthongs, determining one or more canonical representations, generating one or more canonical phonetic forms and performing a phonetic keyword search are performed when the initial search fails to produce a proper result.

3. The method of claim 2, wherein each canonical phonetic form is limited up to six characters.

4. The method of claim 1, wherein performing a phonetic keyword search comprises:
   identifying one or more keywords the canonical phonetic forms of the search term; and
   searching the canonical phonetic forms of the one or more keywords for the canonical phonetic forms of the search term.

5. The method of claim 1, further comprising:
   determining the possible pronunciation for each vowel contained within the search request in consideration of letters before and after the respective vowel;
   generating one or more canonical representations for each of the possible pronunciation of each vowel, wherein the one or more canonical representations do not contain the respective vowel itself; and
   generating the one or more canonical phonetic forms based on possible spellings of the one or more canonical representations of the respective vowel.

6. The method of claim 4, further comprising:
   prior to receiving the search request, generating canonical phonetic forms for a plurality of predetermined keywords including the one or more keywords of the canonical phonetic forms of the search term; and
   storing the canonical phonetic forms of the predetermined keywords in the database prior to receiving the search request.

7. The method of claim 6, wherein generating the canonical phonetic forms of the keywords comprises:
   identifying one or more diphthongs within each predetermined keyword;
   determining one or more canonical representations for at least one of the one or more diphthongs within each predetermined keyword;
   determining whether any canonical representations exist for one or more letters within each predetermined keyword; and
   generating one or more canonical phonetic forms of each predetermined keywords from the canonical representations of the at least one diphthong within the keyword and any canonical representation of the one or more letters within the keyword.

8. The method of claim 3, further comprising ignoring any letter that is not a letter and ignoring a second consecutive appearance of an identical letter when determining the canonical representation of the respective letter of the search term.

9. A machine-readable medium having stored thereon sequences of instructions that, when executed, cause one or more electronic systems to:
   receive a search request at a server from a client over a network, the search request including one or more search terms;
   for each search terms in the search request, identify all diphthongs within each search term;
   determine one or more canonical representations for each diphthong based on pronunciation of each diphthong, the one or more canonical representations being in text formats;
   generate one or more canonical phonetic forms for each search term based on possible spellings of the one or more canonical representations of each diphthong, including determining whether any canonical representations exist for one or more letters of each search term, and including in the one or more canonical phonetic forms of any canonical representations exist for one or more letters of each search term;

perform a phonetic keyword search in a database for each canonical phonetic form of the search term, wherein the canonical phonetic search is performed based on the canonical phonetic forms generated from the canonical representation of both letters and diphthongs of the search request; and generate an indication of search results based on the phonetic keyword search.

10. The machine-readable medium of claim 9, wherein the sequences of instructions that cause the one or more electronic systems to perform an initial search in the database based on each search term of the search request, wherein identifying all diphthongs, determining one or more canonical representations, generating one or more canonical phonetic forms, and performing a phonetic keyword search are performed when the initial search fails to produce a proper result.

11. The machine-readable medium of claim 10, wherein each canonical phonetic form is limited up to six characters.

12. The machine-readable medium of claim 9, wherein the sequences of instructions that cause the one or more electronic systems to perform a phonetic keyword search comprise sequences of instructions that, when executed, cause the one or more electronic systems to:

identify one or more keywords the canonical phonetic forms of the search term; and search canonical phonetic forms of keywords for one or more of the canonical phonetic forms of the search term.

13. The machine-readable medium of claim 9, wherein the sequences of instructions, when executed, further cause the one or more electronic systems to:

determine the possible pronunciation for each vowel contained within the search request in consideration of letters before and after the respective vowel;

generate one or more canonical representation for each of the possible pronunciation of each vowel, wherein the one or more canonical representations do not contain the respective vowel itself; and generate the one or more canonical phonetic forms based on possible spellings of the one or more canonical representations of the respective vowel.

14. The machine-readable medium of claim 12, further comprising sequences of instructions that, when executed, cause the one or more electronic systems to prior to receiving the search request, generate canonical phonetic forms for a plurality of predetermined keywords including the one or more keywords of the canonical phonetic forms of the search term, and store the canonical phonetic forms of the predetermined keywords in a database prior to receiving the search request.

15. The machine-readable medium of claim 14, wherein the sequences of instructions that cause the one or more electronic systems to generate canonical phonetic forms of the keywords comprise sequences of instructions that, when executed, cause the one or more electronic systems to:

identify one or more diphthongs within each predetermined keyword;

determine one or more canonical representations for at least one of the one or more diphthongs within each predetermined keyword;

determine whether any canonical representations exist for one or more letters within each predetermined keyword; and generate one or more canonical phonetic forms of each predetermined keywords from the canonical representations of the at least one diphthong within the keyword and any canonical representation of the one or more letters within the keyword.

16. The machine-readable medium of claim 11, wherein the sequences of instructions further cause the system to ignore any letter that is not a letter and ignore a second consecutive appearance of an identical letter when determining the canonical representation of the respective letter of the search term.

17. An apparatus comprising:

a processor; and a memory coupled to the processor, the memory having stored thereon sequences of instructions that, when executed, cause one or more electronic systems to receive a search request at a server from a client over a network, the search request including one or more search terms, for each search term in the search request, identify all diphthongs within each search term, determine one or more canonical representations for each diphthong based on pronunciation of each diphthong, the one or more canonical representations being in text formats, generate one or more canonical phonetic forms for each search term based on possible spellings of the one or more canonical representations of each diphthong, including determining whether any canonical representations exist for one or more letters of each search term, and including in the one or more canonical phonetic forms of any canonical representations exist for one or more letters of each search term, perform a phonetic keyword search in a database for each canonical phonetic form of the search term, wherein the canonical phonetic search is performed based on the canonical phonetic forms generated from the canonical representation of both letters and diphthongs of the search request, and generate an indication of search results based on the phonetic keyword search.

18. The apparatus of claim 17, wherein the sequences of instructions that cause the one or more electronic systems to perform an initial search in the database based on each search term of the search request, wherein identifying all diphthongs, determining one or more canonical representations, generating one or more canonical phonetic forms, and performing a phonetic keyword search are performed when the initial search fails to produce a proper result.

19. The apparatus of claim 18, wherein each canonical phonetic form is limited up to six characters.

20. The apparatus of claim 17, wherein the sequences of instructions that cause the one or more electronic systems to perform a phonetic keyword search comprise sequences of instructions that, when executed, cause the one or more electronic systems to:

identify one or more keywords the canonical phonetic forms of the search term; and search the canonical phonetic forms of keywords for one or more of the canonical phonetic forms of the search term.

21. The apparatus of claim 17, wherein the sequences of when executed, further cause the one or more electronic systems to:
- determine the possible pronunciation for each vowel contained within the search request in consideration of letters before and after the respective vowel;
- generate one or more canonical representation for each of the possible pronunciation of each vowel, wherein the one or more canonical representations do not contain the respective vowel itself; and
- generate the one or more canonical phonetic forms based on possible spellings of the one or more canonical representations of the respective vowel.

22. The apparatus of claim 20, further comprising sequences of instructions that, when executed, cause the one or more electronic systems to
- prior to receiving the search request, generate canonical phonetic forms for a plurality of keywords including the one or more keywords of the canonical phonetic forms of the search term, and
- store the canonical phonetic forms of the predetermined keywords in a database prior to receiving the search request.

23. The apparatus of claim 22, wherein the sequences of instructions that cause the one or more electronic systems to generate canonical phonetic forms of the keywords comprise sequences of instructions that, when executed, cause the one or more electronic systems to
- identify one or more diphthongs within each predetermined keyword,
- determine one or more canonical representations for at least one of the one or more diphthongs within each predetermined keyword,
- determine whether any canonical representations exist for one or more letters within each predetermined keyword, and
- generate one or more canonical phonetic forms of the keywords from the canonical representations of the at least one diphthong within the keyword and any canonical representation of the one or more letters within each predetermined keyword.

24. The apparatus of claim 19, wherein the sequences of instructions further cause the system to ignore any letter that is not a letter and ignore a second consecutive appearance of an identical letter when determining the canonical representation of the respective letter of the search term.

25. A computer data signal embodied in a data communications medium shared among a plurality of network devices comprising sequences of instructions that, when executed, cause one or more electronic systems to:
- receive a search request at a server from a client over a network, the search request including one or more search terms:
- for each search term in the search request, identify all diphthongs within each search term;
- determine one or more canonical representations for each diphthong based on pronunciation of each diphthong, the one or more canonical representations being in text formats;
- generate one or more canonical phonetic forms for each search term based on possible spellings of the one or more canonical representations of each diphthong, including
  - determining whether any canonical representations exist for one or more letters of each search term, and
  - including in the one or more canonical phonetic forms of any canonical representations exist for one or more letters of each search term;
- perform a phonetic keyword search in a database for each canonical phonetic form of the search term, wherein the canonical phonetic search is performed based on the canonical phonetic forms generated from the canonical representation of both letters and diphthongs of the search request; and
- generate an indication of search results based on the phonetic keyword search.

26. The computer data signal of claim 25, wherein the sequences of instructions that cause the one or more electronic systems to perform an initial search in the database based on each search term of the search request, wherein identifying all diphthongs, determining one or more canonical representations, generating one or more canonical phonetic forms, and performing a phonetic keyword search are performed when the initial search fails to produce a proper result.

27. The computer data signal of claim 26, wherein each canonical phonetic form is limited up to six characters.

28. The computer data signal of claim 25, wherein the sequences of instructions that cause the one or more electronic systems to perform a phonetic keyword search comprise sequences of instructions that, when executed, cause the one or more electronic systems to:
- identify one or more keywords the canonical phonetic forms of the search term; and
- search canonical phonetic forms of keywords for one or more of the canonical phonetic forms of the search term.

29. The computer data signal of claim 25, wherein the sequences of instructions, when executed, further cause the one or more electronic systems to:
- determine the possible pronunciation for each vowel contained within the search request in consideration of letters before and after the respective vowel;
- generate one or more canonical representation for each of the possible pronunciation of each vowel, wherein the one or more canonical representations do not contain the respective vowel itself; and
- generate the one or more canonical phonetic forms based on possible spellings of the one or more canonical representations of the respective vowel.

30. The computer data signal of claim 28, further comprising sequences of instructions that, when executed, cause the one or more electronic systems to
- generate prior to receiving the search request, canonical phonetic forms for a plurality of predetermined keywords including the one or more keywords of the canonical phonetic forms of the search term, and
- store the canonical phonetic forms of the predetermined keywords in a database prior to receiving the search request.

31. The computer data signal of claim 30, wherein the sequences of instructions that cause the one or more electronic systems to generate the canonical phonetic forms of keywords comprise sequences of instructions that, when executed, cause the one or more electronic systems to:
- identify one or more diphthongs within each predetermined keyword;
- determine one or more canonical representations for at least one of the one or more diphthongs within each predetermined keyword;

determine whether any canonical representations exist for one or more letters within each predetermined keyword; and generate one or more canonical phonetic forms of the keywords from the canonical representations of the at least one diphthong within the keyword and any canonical representation of the one or more letters within each predetermined keyword.

32. The computer data signal of claim 27, wherein the sequences of instructions further cause the system to ignore any letter that is not a letter and ignore a second consecutive appearance of an identical letter when determining the canonical representation of the respective letter of the search term.

* * * * *